May 20, 1930. J. S. KEEN 1,759,701
VALVE GEAR
Filed Sept. 26, 1929   3 Sheets-Sheet 1

Inventor:
John S. Keen
by his Attorneys

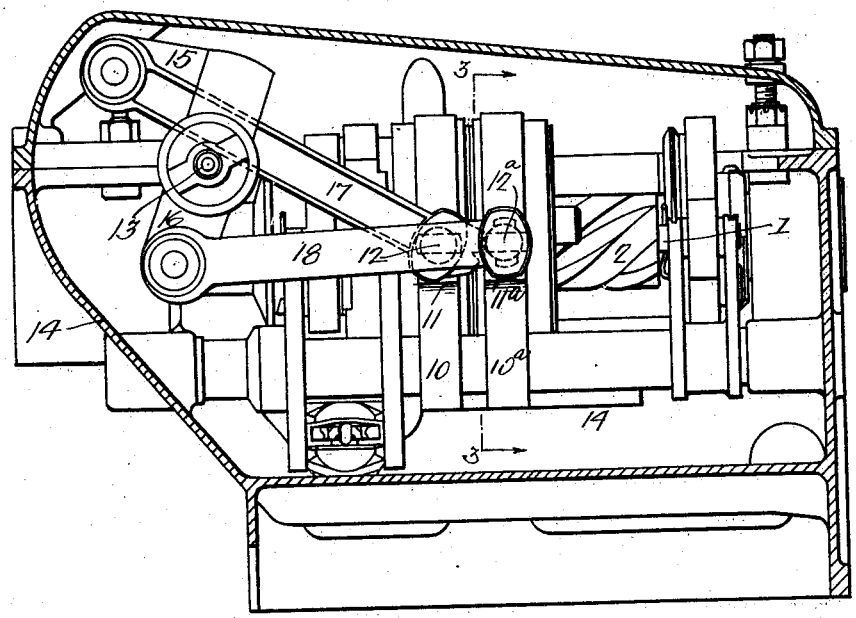
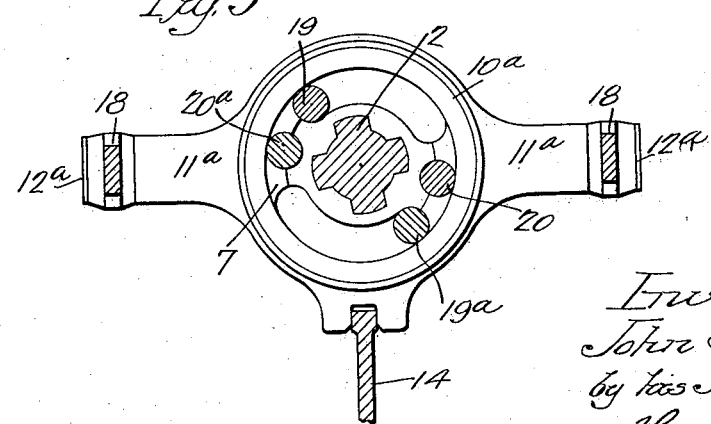

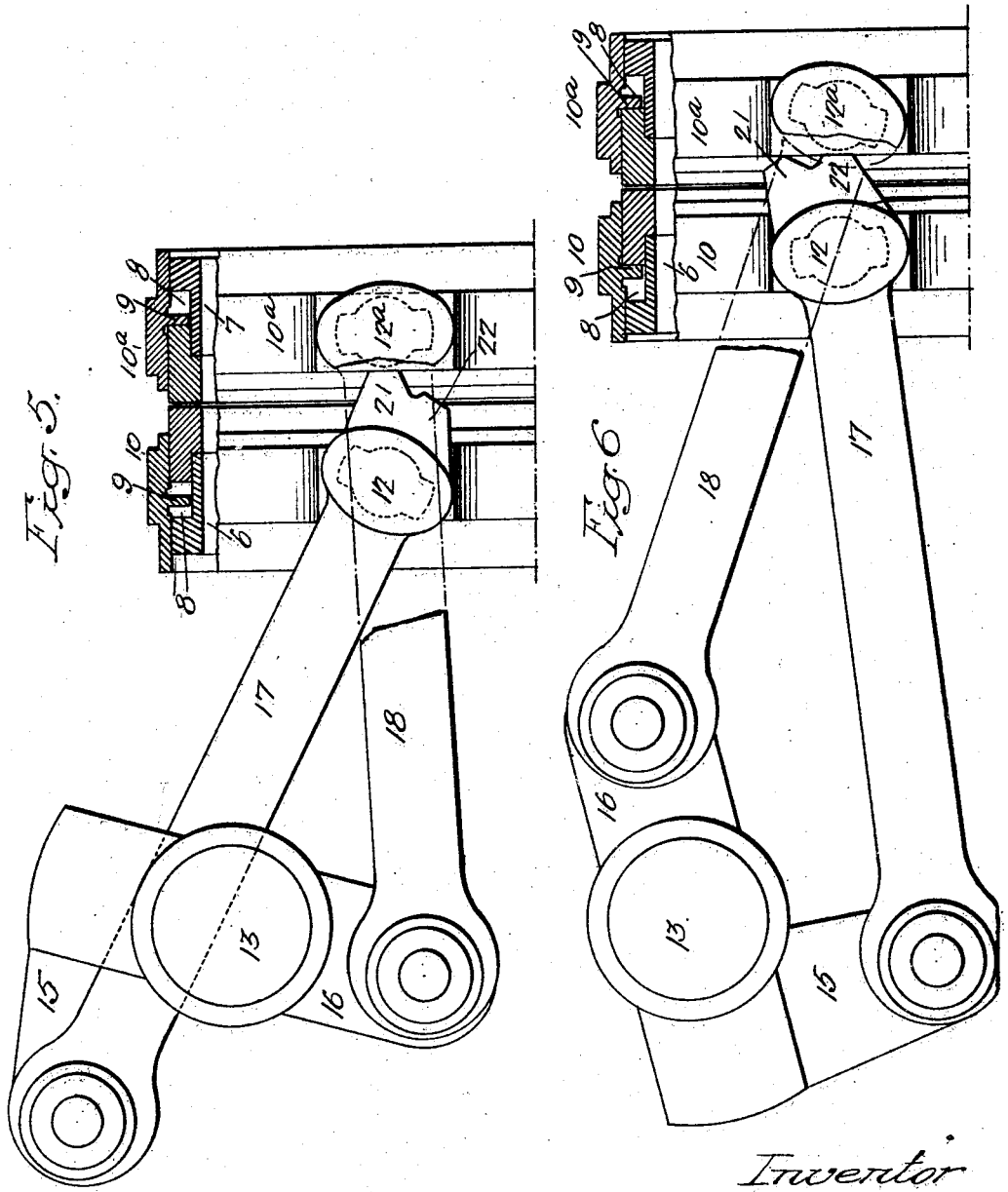

Patented May 20, 1930

1,759,701

UNITED STATES PATENT OFFICE

JOHN S. KEEN, OF PHILADELPHIA, PENNSYLVANIA

VALVE GEAR

Application filed September 26, 1929. Serial No. 395,358.

My invention relates to certain improvements in valve gears for reversing steam engines, for which a patent was granted to Arturo Caprotti, on the 11th day of August, 1925, No. 1,549,712.

One object of my invention is to provide a safety means for preventing the jamming of the shifter straps and the sleeves of the valve gear when in either of two extreme positions, so as to prevent breaking of parts and to allow for shifting without undue friction.

A further object of the invention is to locate the stop devices within the box containing the valve gear.

And a still further object is to so design the parts that the stops will be on the outer portions of the valve shifter within the box, insuring the two sleeves being parallel when in their extreme positions.

The invention is particularly adapted for use in locomotive valve gears of the type above described, where the valve gear is reversed by power.

In the accompanying drawings:

Fig. 2 is a longitudinal section of the box, the valve gear casing being partly in section;

Fig. 3 is a transverse section on the line 3—3, Fig. 2;

Figs. 5 and 6 are diagrams illustrating my invention in full forward and full reverse positions respectively.

Figure 1:
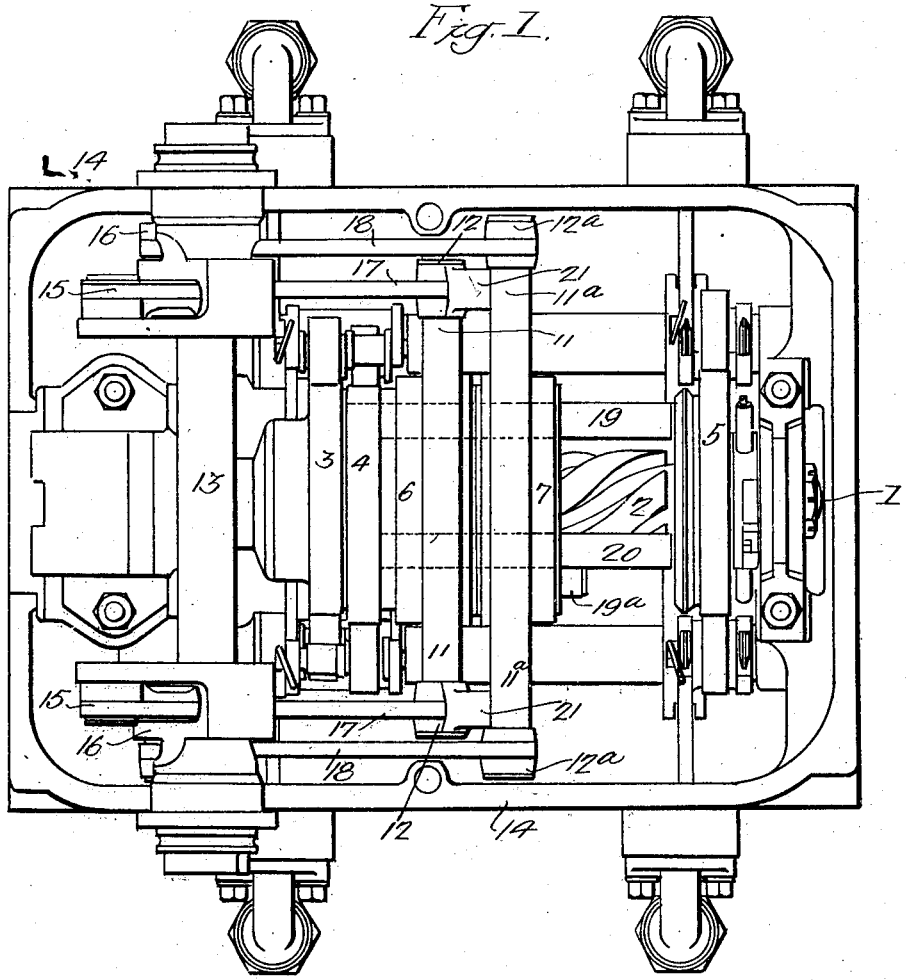
Fig. 1 is a plan view of the valve gear, illustrating my improvement, the cap plate of the box being removed.
Figure 4:
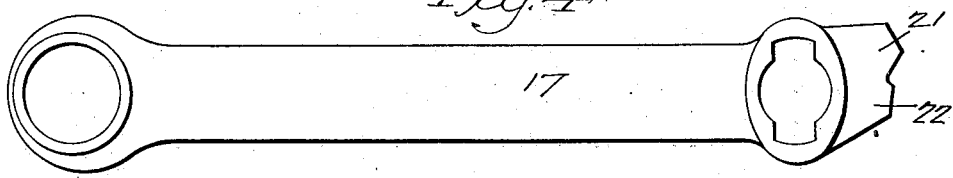
Fig. 4 is a perspective view of one of the connecting rods, showing the improved stops.

The valve gear of the patent mentioned above consists of a distribution power driven shaft 1, which rotates at the same speed as the driving axle of the locomotive. On this shaft 1 is a quick pitch driving screw 2, having a multiple thread in the present instance, which forms spiral splines. Loosely mounted on the shaft, beyond one end of the screw, are two cams 3 and 4. The cam 3 serves only to control the opening of the admission passage-ways when the engine is running forward, and the cam 4 controls the cut-off of the same passageway, and when in the reverse position the cam 4 is the admission cam and the cam 3 the cut-off cam.

Loosely mounted on the shaft beyond the opposite end of the screw is an exhaust cam 5, which is the same as that shown and described in the above-mentioned patent. This exhaust cam and its operating mechanism forms no part of the present invention.

Mounted on the driving screw 2 are two sleeves 6 and 7, having spiral grooves for the threads or splines of the screw 2. The sleeves are driven by the screw but are free to be moved longitudinally thereon. Each sleeve has an annular groove 8 in its periphery, in which extends an annular tongue 9 on a shifting strap. 10 is the shifting strap for the sleeve 6, and 10ª is the shifting strap for the sleeve 7. The shifting strap 10 has an extended portion 11 at each side, on which are trunnions 12, and the strap 10ª has an extended portion 11ª of greater length than the portions 11, and on this portion are trunnions 12ª.

A reversing shaft 13 is adapted to suitable bearings in the box 14 and is actuated by any suitable mechanism operated from the cab of the locomotive. At each end of the reversing shaft 13 is a pair of cranks 15 and 16, one crank of each set being at an angle to the other as shown.

Connecting the crank 15 to the trunnion 12 on the strap 10 are rods 17, and connecting the cranks 16 with the trunnions 12ª on the strap 10ª are rods 18.

Secured to the cam 3 are two rods 19—19ª, which are parallel with the shaft 1. Both rods extend through slots in the cam 4 through the holes in the sleeve 6 and through slots in the sleeve 7. One of the rods is of greater length than the other and extends through a slot in the exhaust cam 5.

Secured to the cam 4 are two rods 20—20ª, which extend through slots in the sleeve 6 and through holes in the sleeve 7. One of the rods extends through a slot in the exhaust cam 5 and with the rod 19, serves to control said exhaust cam to a limited extent.

It will be understood that the cam 3 is the inlet cam and the cam 4 is the cut-off when the locomotive is going forward. When the valve gear is reversed the cam 4 is the inlet cam and the cam 3 is cut off, and these two cams control the movement of the exhaust to a certain extent.

By the above arrangement it will be seen that the cam 3 is adjusted to secure a certain lead and the cam 4 is adjusted for a certain cut off, when going forward. This is accomplished by the sleeves 6 and 7 and the rods 19—19ª and 20—20ª.

The cam 3 is adjusted by the sleeve 6, through the rods 19—19ª, and the cam 4 is adjusted by the sleeve 7 through the rods 20—20ª, as fully described in the patent mentioned above.

When the sleeves are moved to full forward position or to full reverse position, the sleeves tend to jam, and excess friction is exerted between the tongues of a shifter and the wall of the slot in the sleeve. The main feature of my invention is to prevent this jamming and excesive friction, by providing means which will prevent the sleeves from coming in forcible contact when the parts are in either the full forward or full reverse positions. This I accomplish by providing the connecting rods 17 with two lugs 21 and 22, one located at an angle to the other and one projecting slightly beyond the other. These lugs form stops which come in contact, in the present instance, with the extended portions 11ª of the shifter 10ª on which are the trunnions 12ª.

By this arrangement the two shifters 10—10ª are held a given distance apart at the full forward or reverse position so that the tongue 9 on one shifter will be prevented from forcing its sleeve against the sleeve controlled by the other shifter.

This invention is particularly useful on large locomotives using power reverse mechanism, as it is difficult to stop the power reverse at a given point. In a hand-operated reverse, the hand can feel the contact and back off slightly if necessary, before damage is done. The engine man cannot feel the contact through a power reverse mechanism before the damage is done.

While the invention is particularly adapted for use with power control mechanism, it can be used to advantage on all forms of reverse mechanism.

The peculiarity of the valve gear as described in the above mentioned patent is that the shifters, when in the forward position, are further apart than when in the reverse position, as shown in the diagram. Consequently, by the use of two lugs of different lengths which project beyond the ends of the rods 17—17, the longer lug comes in contact with the shifter actuated by the rods 18—18 when in the forward position, and the shorter legs come in contact with the shifter actuated by the rods 18—18 when in the reverse position.

I claim:

1. The combination in a valve gear having two sleeves mounted side-by-side, of a shifter on each sleeve; power means for turning the sleeves but said sleeves being capable of adjustment longitudinally; a controlling shaft connected to the shifters of the two sleeves; means for preventing the jamming of the sleeves and their shifters when in either of the two extreme positions; and valve operating cams connected to the sleeves.

2. The combination in a valve gear, of a shaft having a spiral spline thereon; two cams loose on the shaft; two sleeves on the splined portion of the shaft, one controlling one cam and the other controlling the other cam; means for shifting the said sleeves longitudinally on said shaft; and stops preventing the sleeves from jamming when the mechanism is in either of its two extreme positions.

3. The combination in a valve gear having a power driven distribution shaft, of a driving spiral spline thereon; two shifting sleeves mounted on the splined portion of the shaft so as to turn with said splined portion and capable of being moved longitudinally with respect thereto; two cams, one connected to one sleeve and the other connected to the other sleeve so that they can be adjusted on said shaft; a shifter for each sleeve; reverse crank mechanism; rods connecting the crank mechanism with each of said shifters; and stops for limiting the movement of the shifters when in either of the two extreme positions, to prevent binding of the parts.

4. The combination in a valve gear, of a power driven shaft, having a screw or spline portion thereon; two cams located side-by-side on said shaft beyond one end of the screw; two slotted sleeves on the screw and arranged to turn with said screw but capable of being adjusted longitudinally thereon, one sleeve connected to one cam, the other sleeve connected to the other cam; a shifter for each sleeve in which the sleeves are free to turn; a double crank reverse shaft, rods at each side of the gear connecting the cranks to their respective shifters; and stops on one pair of rods arranged to come in contact with the shifter, to which the other pair of rods is connected when the mechanism is in its extreme position.

5. The combination in a valve gear, of a power driven shaft; a driving screw thereon; two cams located side-by-side on said shaft beyond one end of the screw; two sleeves meshing with the screw and arranged to turn with said screw but capable of being adjusted longitudinally thereon, one sleeve connected to one cam, the other sleeve connected to the other cam; a shifter on each sleeve in which the sleeve is free to turn; and a double crank reverse shaft, rods at each side of the gear connecting the cranks to the shifters, one set of connecting rods which are attached to one shifter, having two stops arranged to come in contact with the shifter to which the other rods are connected, when in either of the two extreme positions of the mechanism.

6. The combination in a valve gear, of a power driven shaft; a driving screw thereon; two cams located side-by-side on said shaft beyond one end of the screw; two sleeves meshing with the screw and arranged to turn with said screw but capable of being adjusted longitudinally thereon, one sleeve connected to one cam, the other sleeve connected to the other cam; a shifter on each sleeve in which the sleeve is free to turn; a double crank reverse shaft having connecting rods at each side of the gear, one rod being connected to one crank of the shaft and to one of the shifters, the other rod being connected to the other crank and the other shifter; and two stops on one set of rods, one stop being of greater length than the other, so that when the mechanism is in the extreme forward position, the stop of greater length will prevent the parts jamming, and when in the extreme reverse position the shorter stop will prevent the parts jamming.

7. The combination in a valve gear having a power driven reverse shaft; a driving screw thereon; two shifting sleeves mounted on the screw so as to turn with the screw and capable of being adjusted longitudinally thereon; two cams arranged side-by-side, on said shaft, one cam being connected to one sleeve and the other cam being connected to the other sleeve; a shifter on each sleeve for controlling the position of its sleeve, each shifter having trunnions, the trunnions of one shifter extending beyond those of the other shifter; a reversing shaft; a pair of cranks at each end of the shaft; rods connecting one set of cranks to the shifter having the extended trunnions; rods connecting the cranks with the trunnions of the other shifter; and lugs on the last-mentioned rods arranged to come in contact with the extended portions of the other shifter when the parts are in either of their two extreme positions.

JOHN S. KEEN.